United States Patent [19]

Ooshima et al.

[11] Patent Number: 5,283,392
[45] Date of Patent: Feb. 1, 1994

[54] ELECTRIC POWER CABLE LINE AND A METHOD OF FABRICATING THE SAME

[75] Inventors: Hiroto Ooshima, Saitama; Michio Takaoka, Chiba; Hisao Sakaguchi, Tokyo, all of Japan

[73] Assignee: Fujikura Ltd., Tokyo, Japan

[21] Appl. No.: 863,409

[22] Filed: Apr. 3, 1992

[30] Foreign Application Priority Data

Apr. 25, 1991 [JP] Japan ................... 3-122677

[51] Int. Cl.⁵ ................ H02G 15/064; H02G 15/103; H02G 1/14
[52] U.S. Cl. ....................... 174/84 R; 174/68.1; 174/70 R; 174/73.1; 174/74 A; 174/88 C
[58] Field of Search ............... 174/84 R, 88 C, 70 R, 174/73.1, 74 A, 85, 68.1

[56] References Cited

U.S. PATENT DOCUMENTS

| | | | |
|---|---|---|---|
| 2,158,492 | 5/1939 | Bishop | 174/705 |
| 2,283,117 | 5/1942 | Arutunoff | 174/68.1 |
| 2,355,545 | 8/1944 | Meyerhens et al. | 174/74 A |
| 3,928,519 | 12/1975 | Kashiyama et al. | 174/107 |
| 4,224,462 | 9/1980 | Occhini et al. | 174/37 |
| 4,424,410 | 1/1984 | Edgerton | 174/73.1 |
| 4,446,331 | 5/1984 | Takaoka et al. | 174/73 R |
| 4,454,375 | 6/1984 | Takaoka et al. | 174/73 R |

FOREIGN PATENT DOCUMENTS

| | | |
|---|---|---|
| 578997 | 6/1933 | Fed. Rep. of Germany . |
| 3226380 | 2/1983 | Fed. Rep. of Germany . |
| 503147 | 11/1955 | Italy ................. 174/73.1 |
| 2-59475 | 5/1990 | Japan . |
| 2017388 | 10/1979 | United Kingdom . |

*Primary Examiner*—Morris H. Nimmo
*Attorney, Agent, or Firm*—Frishauf, Holtz, Goodman & Woodward

[57] ABSTRACT

An electric power cable line is arranged in which the insulating layer is increased to a greater thickness at two end portions of each cable than a thickness at the other or center portion of the same. Since the insulating layer is increased in thickness at the end portions of the cable, thus an electrical stress exerted on the overall layer construction of the end portions is lowered. Hence, the dielectric strength of the end portions of the cable becomes high and the power cable line will thus be increased in the operational reliability.

9 Claims, 5 Drawing Sheets

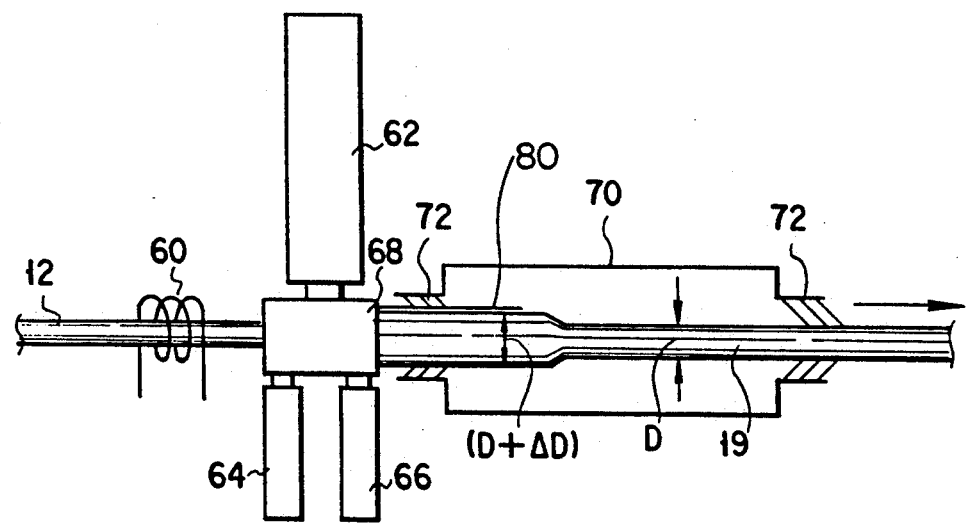
F I G. 7
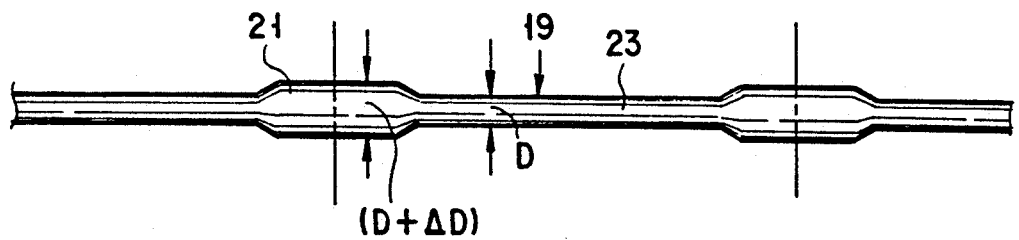
F I G. 8
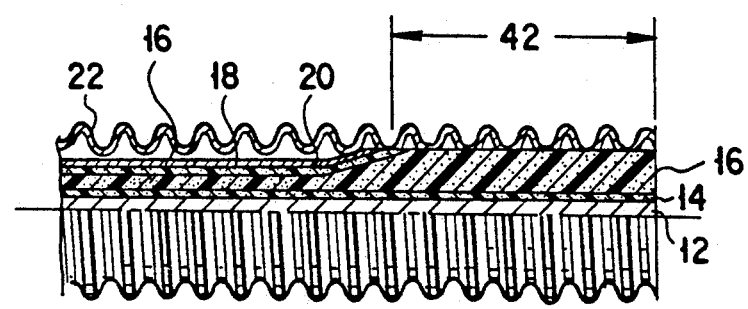
F I G. 9

ELECTRIC POWER CABLE LINE AND A METHOD OF FABRICATING THE SAME

BACKGROUND OF THE INVENTION

1. Field of the Invention

The present invention relates to an electric power cable line.

2. Description of the Related Art

One of known electric power cable lines which are commonly in use is illustrated in FIG. 1. Shown are power cables 10, straight joints 28 for jointing two cables to each other, terminal ends 29, straight joint constructions 30, and terminal end constructions 31.

FIG. 2 is a longitudinal cross sectional view of the cable 10, in which there are provided a center conductor 12, an inner semiconductive layer 14, a cable insulating layer 16, an outer semiconductive layer 18, a shield layer 20, and a sheath 22. FIG. 2 illustrates an upper half of the cable 10 for simplicity because two, upper and lower, halves of the cable 10 are symmetrical about the axis. FIG. 3 is a schematic view of the straight joint construction 30 showing a joint box 31, an epoxy unit 32, a premolded stress relief cone 34, a retainer 36, and a conductive connector 38.

It is essential for the electric power cable line to withstand a high voltage in long-time service. It is common for the dielectric strength of the straight joints and terminal ends in a long-time supply of high voltage to be as low as about 60% of that of the cable. To increasing the operational reliability of the cable lines, improved straight joints and terminal ends are much desired.

SUMMARY OF THE INVENTION

It is thus an object of the present invention to provide an electric power cable line which is improved in the operational reliability through increasing the dielectric strength of its straight joints and terminal ends so that it can withstand against a high voltage throughout the long-time service.

An electric power cable line according to the present invention is provided in which the insulating layer 16 is increased to have a greater thickness T2 at two end portions 42 of each cable 40 than a thickness T1 at the other or center portion of the same, as best shown in FIG. 4.

The insulating layer 16 is increased in thickness at the end portions 42 of the cable 40 thus lowering an electrical stress exerted on the overall layer construction of the end portions 42. Hence, the dielectric strength of the end portions 42 of the cable 40 becomes high and the power cable line will thus be increased in its operational reliability.

Also, both the straight joint construction 50 of each straight joint 48 and the terminal end construction 51 of each terminal end 49 of the present invention are arranged to be identical to those of a known power cable line so that the thickness of the insulating layer 16 of the cable 40 can be equal to that of a prior art cable. Accordingly, the dielectric strength will be increased throughout the power cable line.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a schematic view of a device for fabricating cable cores of the cable shown in FIG. 4;

FIG. 8 is an external view of the cable core fabricated by the device shown in FIG. 7;

FIG. 9 is a longitudinal cross sectional view of the cable of the present invention provided with a waveformed cable sheath made of metal;

DETAILED DESCRIPTION OF THE PREFERRED EMBODIMENTS

Preferred embodiments of the present invention will be described in more detail referring to the accompanying.

Figure 1:
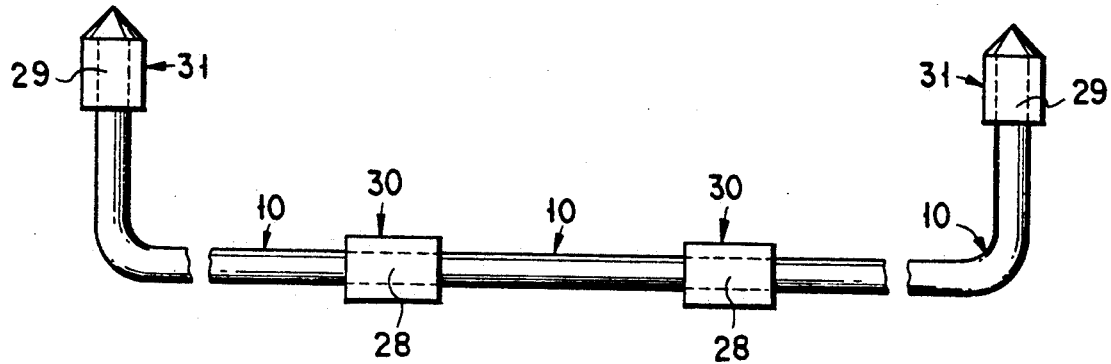
FIG. 1 is a schematic view of a known electric power cable line.
Figure 2:
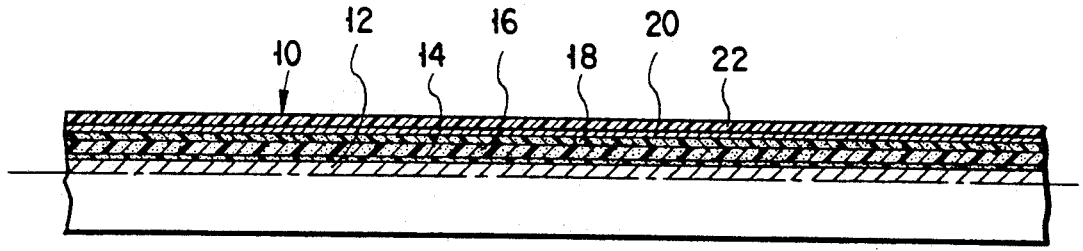
FIG. 2 is a longitudinal cross sectional view of a cable of the known electric power cable line shown in FIG. 1.
Figure 3:
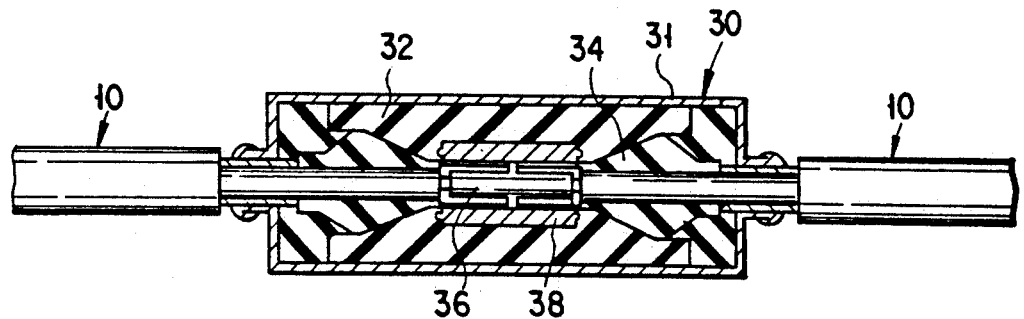
FIG. 3 is a longitudinal cross sectional schematic view of a straight joint construction between the two cables.
Figure 4:
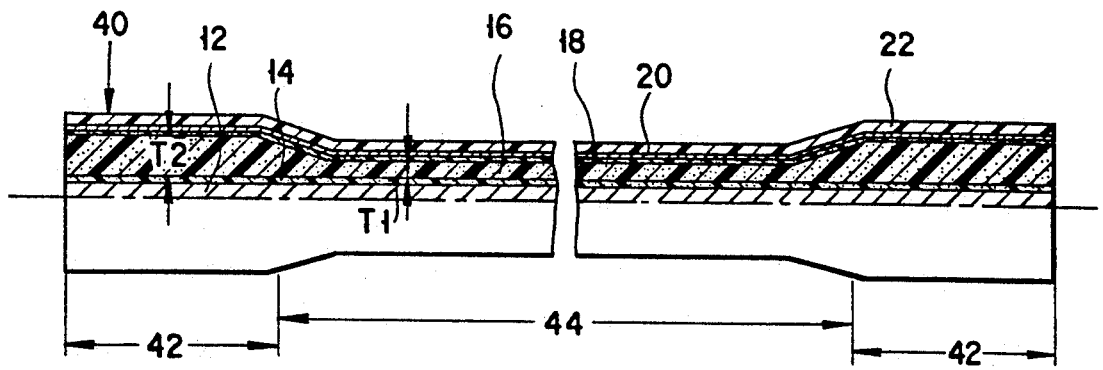
FIG. 4 is a longitudinal cross sectional view of a cable of an electric power cable line according to the present invention.
Figure 5:
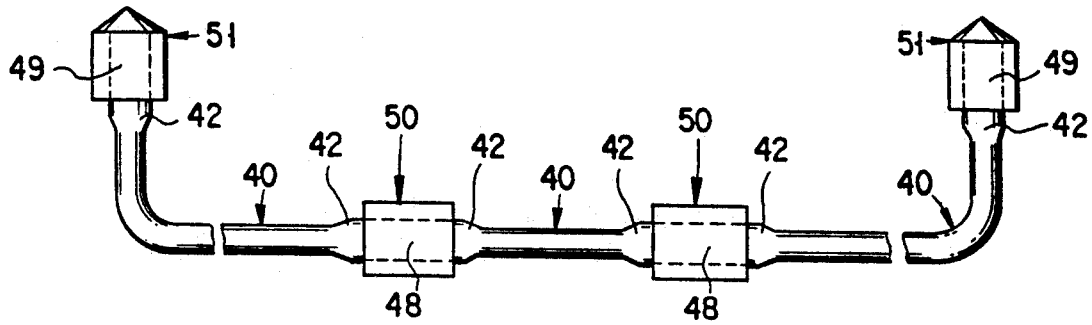
FIG. 5 is a schematic view of the electric power cable line of the present invention incorporating a number of the cables jointed to one another.

FIG. 4 illustrates a cable 40 having at its center a lengthwise extending cable conductor 12. The cable conductor 12 is covered with, (starting from the inside), an inner semiconductive layer 14, an insulating layer 16, an outer semiconductive layer 18, a shield layer 20, and a sheath 22. FIG. 4 shows an upper half of the cable 40 in cross section for simplicity since two, upper and lower, halves of the cable 40 are identical. FIG. 5 shows an electric power cable line in which a number of the cables 40 shown in FIG. 4 are jointed to one another. Also, shown are straight joints 48 for jointing the cables 40, terminal ends 49, straight joint constructions 50, and terminal end constructions 51. The two terminal ends 49 are provided at both ends of the cable line.

As shown in FIG. 4, each end portion 42 of the cable 40 is arranged greater in diameter as the thickness of the insulating layer 16 is increased to T2 from T1 of a center portion 44 of the cable 40. The insulating layer 16 is increased in the thickness for enhancing the dielectric strength of the two cable end portions 42 where a level of dielectric strength is relatively low. Accordingly, the straight joints 48 and the terminal ends 49 to which the cable end portions 42 are fitted will be increased in the dielectric strength, thus improving the operational reliability of the electric power cable line. The straight joint construction 50 and the terminal end construction 51 are identical in arrangement to those of a known power cable line which have insulating layers arranged equal in thickness to that of the cable end portion 42. Hence, they are also increased in the dielectric strength.

The thickness T2 of the insulating layer 16 at the cable end portion 42 is preferably one class greater than that of the known power cable line. For example, when the thickness T1 of the insulating layer 16 is 9 mm in a cable 40 of 66 kV type, the thickness T2 should be 13 mm at each cable end portion 42. The insulating layer 16 of 13 mm is standard on a cable of 77 kV type which is one class higher than the 66 kV cable in the industry. This allows the straight joint constructions 50 and the terminal end constructions 51 to be substituted with commonly available 77 kV cable counterparts.

Figure 6:
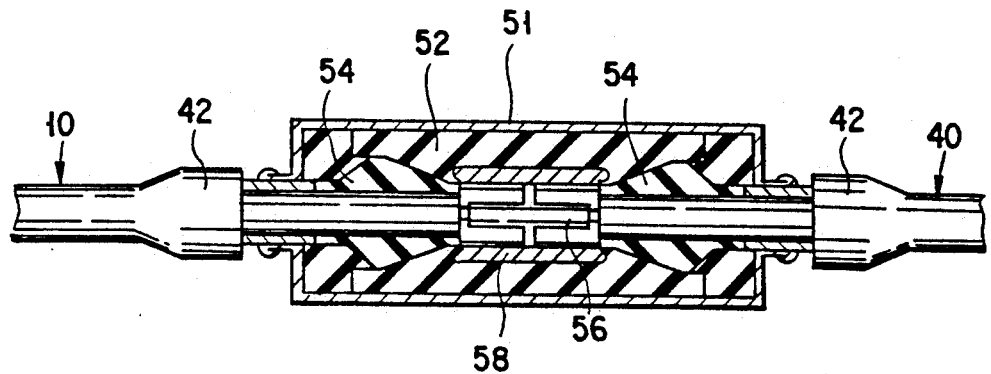
FIG. 6 is a longitudinal cross sectional schematic view of a straight joint construction for jointing the two cables shown in FIG. 4.

The straight joint construction 50 is arranged of epoxy unit type prefabrication form, as shown in FIG. 6, in which the jointing end of an adjacent cable 10 provided with its sheath (not shown) being removed off is coupled by a retainer 56 to the cable 40. The cable conductor 12 of the two cables 10 and 40 are jointed to each other by a conductive connector 58. The cable ends where no sheath is provided are hence protected with a premolded stress relief cone 54 for stress relief. The conductive connector 58 and the premolded stress relief cone 54 are also covered with an epoxy unit 52 which serves as an outer covering. When the cable 40 is of 66 kV type and the thickness T2 of the insulating layer 16 at each cable end portion 42 is arranged equal to that of a common 77 kV cable, the epoxy unit 52, the premolded stress relief cone 54, the retainer 56, and the conductive connector 58 of the straight joint construction 50 shown in FIG. 6 will be substituted with counterparts of the 77 kV cable. More particularly, the thickness of the insulating layer 16 at the cable end portion 42 which is T1 in the prior art is arranged equal to that of a one class higher cable in respect to the dielectric strength and thus, like components used in the one class higher cable will be employed without modification.

FIG. 7 schematically illustrates a continuous crosslinking extruder for fabricating a length of rubber/plastic power cable according to the present invention.

As shown, there are provided an induction heater coil 60 for heating up a cable conductor with a high-frequency energy, an insulating material extruder 62 for producing the insulating layer 16 (shown in FIG. 4), an inner layer extruder 64 for producing the inner semiconductive layer 14 (shown in FIG. 4), an outer layer extruder 66 for producing the outer semiconductive layer 18 (shown in FIG. 4), a cross head 68, a crosslinking/cooling tube 70, a splice box 80, and pressure sealings 72 for sealing up both entrance and exit of crosslinking/cooling tube 70 airtightly.

In operation, the cable conductor 12 is heated with the induction heater coil 60 and transferred into the cross head 68 where it is coated at surface with the inner semiconductive layer 14 of a semiconductor material extruded from the extruder 64. Succeedingly, the two extruders 62 and 66 feed an insulating material and a semiconductive material respectively for forming the insulating layer 16 and the outer semiconductive layer 18 over the inner semiconductive layer 14 thus to produce a core 19 of the cable. The core 19 is then transferred into the crosslinking/cooling tube 70 where it is first heated again for crosslinking of the layers and then, cooled down.

During the above process of forming the cable core 19, the insulating layer 16 of the cable 40 has to be increased in thickness at intervals of a given time to have the thickness T2 at each end portion 42 of the cable 40 which is greater than T1 at a center portion of the same. FIG. 8 shows the cable core 19 in which the insulating layer 16 is increased in thickness at equal intervals of the distance corresponding to a length of the cable 40. It would be understood that the thickness increased regions of the insulating layer 19 are expressed in FIG. 8 as radially increased portions 21 of the cable core 19 while the insulating layer 19 itself is unshown for ease of explanation. The radially increased portion 21 of the cable core 19 has a diameter of $D+\Delta D$ and the remaining portion or radially reduced portion 23 is D in the diameter.

The cable core 19 is then cut crosswise at each radially increased portion 21 (along the one-dot chain line in FIG. 8) into a multiplicity of the cables 40, which will be described in more detail later. The radially increased portion 21 becomes the end portion 42 of the cable 40.

The cable core 19 having the insulating layer increased in the thickness at equal intervals of the cable length, shown in FIG. 8, is fabricated with the apparatus shown in FIG. 7 when the following five operating conditions are satisfied.

(1) The feeding of the cable conductor 12 shall be slowed down to a given speed when its particular portions which correspond to the end portions 42 of the cable 40 separated at the cutting procedure, move into the cross head 68. The feeding speed across the cross head 68 is determined with reference to the feeding speed of an insulating material from the insulating material extruder 62, the desired thickness of the insulating layer, and the crosslinking and cooling time of the insulating layer at the crosslinking/cooling tube 70.

(2) The heating temperature shall be lowered by decreasing the high frequency output of the induction heater coil 60 in proportion to the reduction of the feeding speed of the cable conductor 12.

(3) The rotation of a screw (not shown) of the inner layer extruder 64 shall be lowered in proportion to the reduction of the feeding speed of the cable conductor 12.

(4) The rotation of a screw (not shown) of the insulating material extruder 62 shall be controlled to a speed desired for producing the thickness T2 of the insulating layer 16 at each end portion 42.

(5) The rotation of a screw (not shown) of the outer layer extruder 66 shall be controlled to a proper speed in proportion to the reduction of the feeding speed of the cable conductor 12.

Through the operation of the apparatus with the above operating conditions being satisfied, the cable core 19 shown in FIG. 8 is produced having the insulating layer 16 increased in the thickness at equal intervals.

The pressure sealings 72 on the crosslinking/cooling tube 70 are arranged to stand a stress caused by an increase, about 15 mm, in the outer diameter of the radially increased portion 21. For example, the increase in the diameter is expressed as $(13-9)\times 2=8$ mm $<15$ mm when the thickness T2 of the insulating layer 16 at the end portion 42 of the cable 40 of the embodiment is 13 mm which is equal to that of the insulating layer of a common 77 kV type cable, as compared with 9 mm of the thickness T1 of the insulating layer 16 of a common 66 kV type cable. Hence, the pressure sealings 72 exhibits an acceptable resistance to stress when used in fabricating 13 mm of the thickness T2 of the insulating layer 16 at the end portion 42 of the cable 40 of 66 kV type which is equal to the thickness of the insulating layer of a one class higher 77 kV cable.

Figure 10:
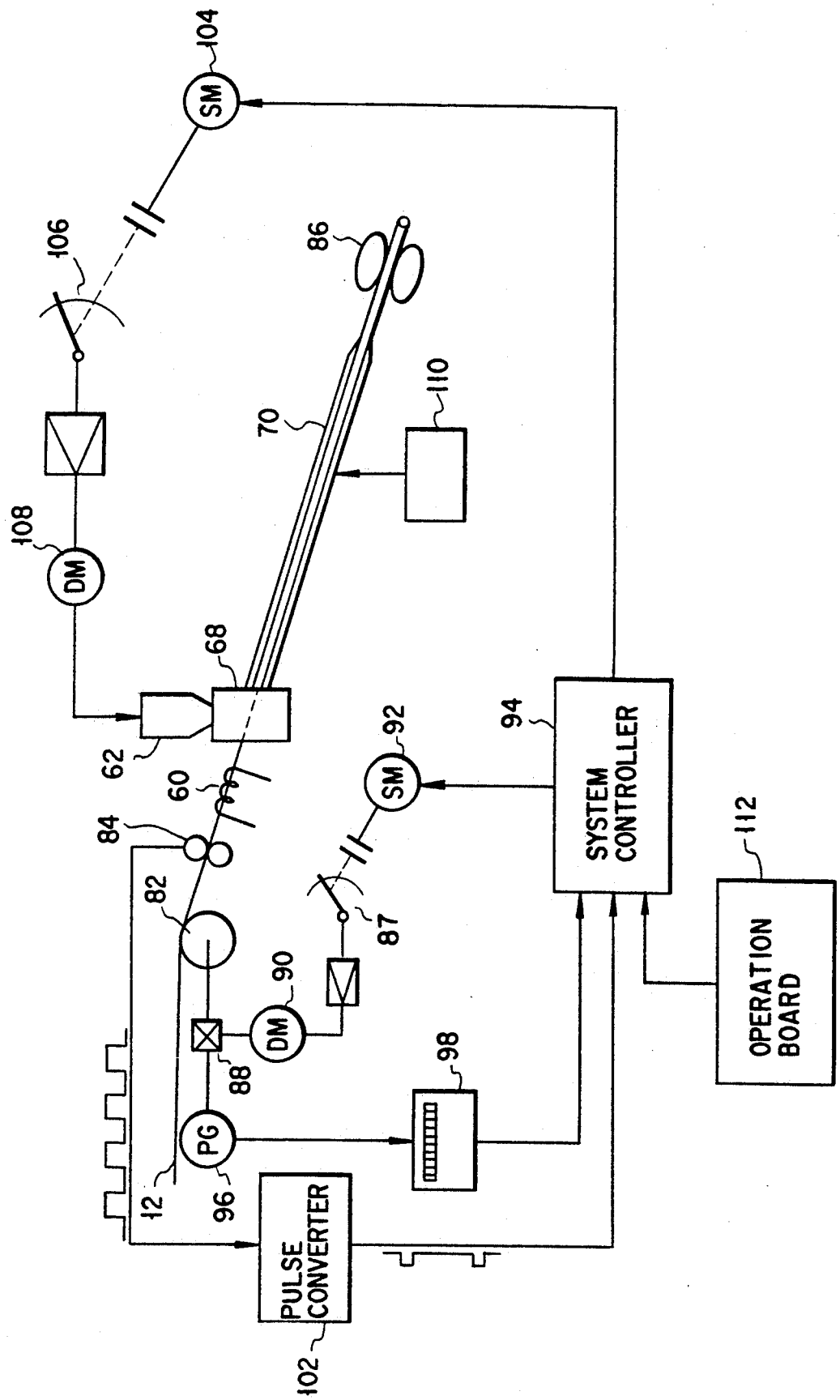
FIG. 10 is a schematic diagram showing a system for fabrication of the cable cores shown in FIG. 8.

FIG. 10 illustrates the entire arrangement of a system for fabricating the cable core of the electric power cable line according to the present invention.

As shown, a metering capstan 82 is provided for feeding the cable conductor 12 through a counter 84 and the induction heater coil 60 to the cross head 68. At the cross head 68, the cable conductor 12 is covered with an inner semiconductive layer, an insulating layer, and an outer semiconductive layer using the unshown inner layer extruder, the insulating material extruder 62, and the unshown outer layer extruder respectively. The cable conductor 12 carrying the layers is then transferred to the bonding and cooling tube 70 for crosslinking and cooling. A finished cable core is drawn out by a takeup caterpillar 86 and rewound onto a takeup drum (not shown).

There is a feeding speed regulator 87 actuated by a servo motor 92 which is controlled with a system controller 94. The feeding speed regulator 87 is arranged to control a drive motor 90 for feeding speed setting. The driving power of the drive motor 90 is transmitted through a reduction gear unit 88 to the metering capstan 82. The rotation of the drive motor 90 is also transmitted from the reduction gear unit 88 to a pulse generator 96 which in turn delivers a digital line speed signal through a line speed meter 98 to the system controller 94. Also, the counter 84 delivers data of a feed distance to a pulse converter 102 which in turn transmits a corresponding pulse signal to the system controller 94.

The inner layer extruder, insulating material extruder, and outer layer extruder are all controlled by the system controller 94 in equal manners. In particular, the controlling of the insulating material extruder 62 will be explained. The driving force of a servo motor 104 controlled by the system controller 94 is transmitted to an extruder speed regulator 106 which in turn determines the feeding speed of the insulating material from the extruder 62. A drive motor 108 is then actuated to produce the insulating material feeding speed at which the insulating material is pushed out by the rotation of a screw of the extruder onto the cable conductor 12. The operation of the inner and outer layer extruders is the same and will be no more explained.

The system controller 94 is actuated by command signals supplied from an operation board 112.

The temperature in the crosslinking/cooling tube 40 can be controlled to given degree by a thermal controller 110.

Figure 11:
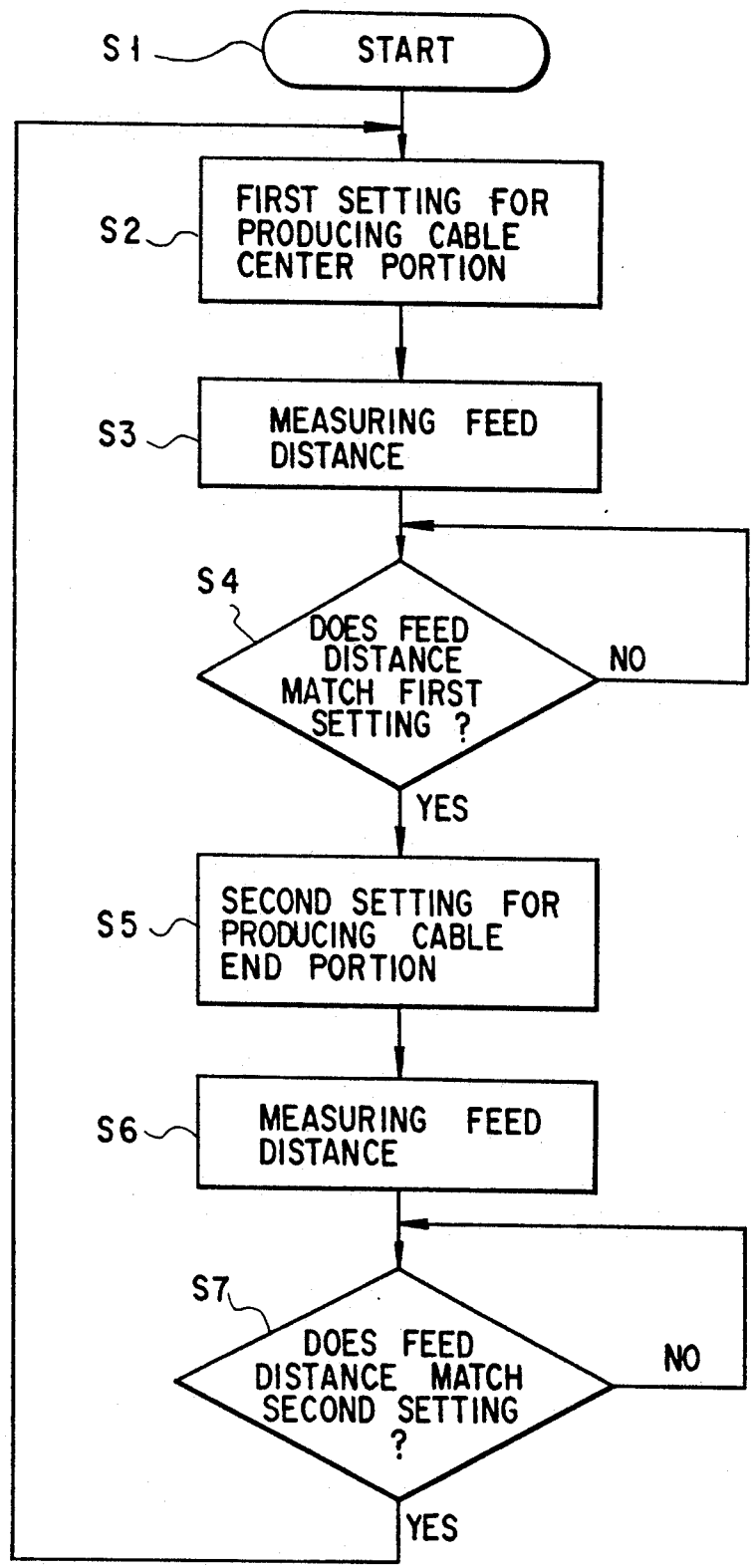
FIG. 11 is a flow chart showing a procedure of steps in the system shown in FIG. 10.

The operation of the system shown in FIG. 10 will now be described referring to FIG. 11.

The system is started at Step S1.

At Step S2, the first setting for producing a center region of the cable is determined with the system controller 9 including the line speed of the line speed regulator 87, the extruder feeding speed of the extruder speed regulator 106, and the temperature of the thermal controller 110.

At Step S3, the number of pulses corresponding to the feed distance is counted with the counter 84 and transmitted through the pulse converter 102 to the system controller 94.

Then, it is examined at Step S4 whether the feed distance of the cable conductor 12 matches the line speed of the first setting of the line speed regulator 87 or not. If not, the measuring operation is repeated and if yes, the procedure moves to Step S5.

At Step S5, the line speed of the line speed regulator 87, the extruder feeding speed of the extruder speed regulator 106, and the temperature of the thermal controller 110 are shifted from the first setting to the second setting for producing both end regions of the cable.

At Step S6, the number of pulses corresponding to the feed distance associated with the second setting is counted with the counter 84 and transmitted through the pulse converter 102 to the system controller 94.

Then, it is examined at Step S7 whether the feed distance matches the line speed of the second setting of the line speed regulator 87 or not. If not, the measuring operation is repeated and if yes, the procedure returns back to Step S1.

Then, the procedure will be repeated from Step S2.

Through repeating the foregoing procedure, the cable core 19 shown in FIG. 8 is fabricated.

The finished cable core 19 wound on the drum is then transferred to the next step for covering with a sheath.

The cable core is fed out from the cable core drum and at the same time, a metal strip is drawn from a metal strip roll. For producing a sheath, the metal strip is folded to a tubular shape so as to cover over the cable core 19 and welded along a seam.

The cable core 19 protected with the sheath 22 is then cut to a number of the cables 40 by shearing across the center of each radially increased portion 21 (denoted by the one-dot chain line in FIG. 8). The radially increased portion 21 becomes the end portion 42 of the cable 40 where the diameter is greater than that of the center portion 44, as shown in FIG. 4.

If the sheath 22 is a wave-formed metal tube as shown in FIG. 9 and its inner diameter is as small as the outer diameter of the radially increased portion 21 of the cable core 19, the semiconductive layer 18 and the shield layer 20 are not provided on the portion 21. Accordingly, the overall diameter of the cable core 19 can substantially match the inner diameter of the metal tube 22 and the cable core 19 will be accommodated in the metal sheath 22 of an extensive length. The semiconductive layer 18 and the shield layer 20 need not be provided on the portion 21, since these layers 18 and 20 on the portion 21 are removed when the cables 40 are jointed to each other.

In production, the wave-formed metal tube 22 is mounted over the cable core 19 by being pressed by a disk shaped pressing rollers circumferentially of the cable core 19.

Also, the foregoing arrangement in which the shield layer 20 is formed not on the radially increased portion 21 of the cable core 19 which become the end portion 42 of the cable 40, but on the center portion 23 of the cable core 19 and the sheath 22 is formed of a metal tube having a uniform inner diameter, allows the insulating layer 16 to be increased in thickness by the thickness of the shield layer 20 at each end portion 42 of the cable 40. This will be much advantageous when the sheath 22 is a wave-formed metal tube. More specifically, such a wave-formed metal tube has its wall of a considerable thickness. Therefore, if the cable 40 is limited to a smaller diameter size, its insulating layer 16 has to be reduced in thickness. However, the foregoing arrangement in which the shield layer 20 is not provided on the cable end forming portion 21 of the cable core 19, permits the insulating layer 20 to be thickened at each cable end portion 4 by the thickness of the shield layer 20.

For producing the shield layer 20 at the center portion 44 of the cable 40, a tape head (not shown) for applying a shielding material (e.g. a strip of copper tape) is actuated when the center portion 23 of the cable core 19 moves into during running and stopped when the radially increased portion 21 runs underneath.

At set forth above, the electric power cable line of the present invention is arranged in which the insulating layer at the end portions of each cable is increased in the thickness more than at the remaining portion so that the dielectric strength on the cable straight joints and terminal ends thereof becomes high. Hence, the power cable line will be enhanced in the operational reliability. Also, the thickness of the insulating layer at the cable end portions is determined identical to that of a commercial cable of one class higher dielectric strength type. Accordingly, the like components of the commonly available cable of any one class higher type can be used for coupling the cables of the present invention to one another and the overall cost of the power cable line will be reduced with no need of designing new joint components.

The higher dielectric strength according to the present invention will be described in conjunction with one example. In the prior art, the dielectric strength of a center region of a common 66 kV cable which is maximum at 500 to 600 kV of a long-time AC supply was declined at our test to as low as about 60% or 300 to 350 kV on the cable jointing point and the terminal end. The cable of the present invention of which insulating layer has a thickness of 13 mm at the end portion which is equal to that of the insulating layer of a known 77 kV cable, exhibited a higher dielectric strength on the cable straight joint and the cable line terminal end which withstood about 360 to 420 kV of a long-time AC supply. More particularly, the dielectric strength on the cable straight joint and the cable line terminal end was increased about 70%. The dielectric strength to 360 to 420 kV is equal to a limit dielectric strength of the cable jointing point or cable line terminal end of the common 77 kV cable. The cable end portion of the present invention contains the insulating layer of an increased thickness so that the dielectric strength at each cable straight joint and also, each cable line terminal end is increased and the electric power cable line will thus be enhanced in the operational reliability.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A finished electric power cable line comprising a multiplicity of cables joined to one another, each of the multiplicity of cables having a cable conductor, an inner semiconductive layer over said cable conductor, an insulating layer over said inner semiconductive layer, and an outer semiconductive layer over said insulating layer, said insulating layer of each of said multiplicity of cables being greater in thickness at first and second end portions thereof which correspond respectively to first and second end portions of the finished cable, than at other remaining portions thereof which are intermediate said first and second end portions thereof.

2. A finished electric power cable line according to claim 1, wherein both a cable straight joint construction of a cable straight joint thereof and a cable line terminal end construction of a cable line terminal end thereof are substantially identical to a construction of a known power cable line having:
   a known cable conductor;
   a known inner semiconductive layer, formed on the known cable conductor;
   a known insulating layer and a known outer semiconductive layer, respectively formed on said known inner semiconductive layer; and wherein:
   the known insulating layer of the known power cable line has a thickness that is substantially constant in a length direction thereof; and
   said substantially constant thickness of the known power cable line being equal to a thickness of the insulating layer at the first and second end portions of each of said multiplicity of cables.

3. A finished electric power cable line according to claim 2, wherein:
   both a cable straight joint construction of a cable straight joint thereof and a cable line terminal end construction of a cable line terminal end thereof are substantially identical to a construction of a straight joint and a cable line terminal end of a known power cable line that is one class higher in dielectric strength than each of said multiplicity of cables;
   the known power cable line having:
   a known cable conductive;
   a known inner semiconductive layer;
   a known insulating layer; and
   a known outer semiconductive layer, and wherein:
   the known insulating layer of the known power cable line has a thickness that is substantially constant in an entire length thereof, said substantially constant thickness of said known power cable line being equal in thickness to a thickness of the insulating layer at the first and second end portions of each of said multiplicity of cables.

4. An electric power cable line according to claim 2, wherein the insulating layer is covered with a shield layer, and a cable sheath.

5. The finished electric power cable line according to claim 1, wherein each of said multiplicity of cables is covered with a shield layer and a cable sheath.

6. A finished electric power cable line according to claim 1, wherein:
   a thickness of the insulating layer at the first and second end portions of each of said multiplicity of cables is substantially equal to a thickness of a known insulating layer of a known power cable line that is one class higher in dielectric strength than each of said multiplicity of cables;
   said known power cable line having:
   a known cable conductor;
   a known inner semiconductive layer formed on the known cable conductor;
   a known insulating layer and a known outer semiconductive layer, respectively formed on said known inner semiconductive layer; and wherein
   the known insulating layer of the known power cable line has a thickness that is substantially constant in a length direction thereof, said substantially constant thickness of said known power cable line being equal to the thickness of the insulating layer at the first and second end portions of each of said multiplicity of cables.

7. A method of fabricating finished cables which are joined to one another to form an electric power cable line, the method comprising the steps of:

applying an inner semiconductive layer on a cable conductor;

covering said inner semiconductive layer with an insulating layer so that a thickness of the insulating layer at particular portions of the cable conductor, which will become first and second end portions of a finished power cable line, is greater than a thickness of other intermediate portions of the cable conductor between said first and second end portions of the finished power cable line;

applying an outer semiconductive layer on said insulating layer;

applying a shield layer on said outer semiconductive layer; and covering said shield layer with a sheath.

8. A method according to claim 7, wherein the sheath comprises a metal tube material having a given shape and the shield layer is applied only on said other intermediate portions of the cable conductor so that an overall diameter of the finished power cable line is prevented from increasing by a thickness of the shield layer at each cable end portion.

9. A method according to claim 8, wherein the sheath comprises a wave-formed metal tube.

* * * * *